United States Patent
Maruyama et al.

(10) Patent No.: US 6,602,995 B2
(45) Date of Patent: Aug. 5, 2003

(54) METHOD FOR THE FORMATION OF LOW-SUBSTITUTED HYDROXYPROPYL CELLULOSE PARTICLES

(75) Inventors: Naosuke Maruyama, Niigata-ken (JP); Hiroshi Umezawa, Niigata-ken (JP)

(73) Assignee: Shin-Etsu Chemical Co., Ltd. (JP)

( * ) Notice: Subject to any disclaimer, the term of this patent is extended or adjusted under 35 U.S.C. 154(b) by 85 days.

(21) Appl. No.: 09/758,898

(22) Filed: Jan. 11, 2001

(65) Prior Publication Data

US 2001/0009961 A1 Jul. 26, 2001

(30) Foreign Application Priority Data

Jan. 14, 2000 (JP) .......................... 2000-005167

(51) Int. Cl.⁷ .................. C08B 11/00; C08B 11/08; C07H 1/00
(52) U.S. Cl. ................. 536/56; 536/84; 536/95; 536/124
(58) Field of Search ................ 536/56, 84, 95, 536/124

(56) References Cited

U.S. PATENT DOCUMENTS

| | | | |
|---|---|---|---|
| 2,488,631 A | 11/1949 | Kunz | 260/231 |
| 3,251,824 A | 5/1966 | Battista | 260/230 |
| 3,290,218 A | 12/1966 | de Jong | 167/82 |
| 3,852,421 A | 12/1974 | Koyanagi et al. | 424/94 |
| 4,091,205 A | 5/1978 | Onda et al. | 536/85 |
| 4,329,451 A | 5/1982 | Zweigle | 536/77 |
| 4,415,124 A | 11/1983 | Carduck et al. | 241/28 |
| 4,716,186 A | 12/1987 | Portnoy et al. | 524/50 |
| 5,200,194 A | 4/1993 | Edgren et al. | 424/473 |
| 5,516,531 A | 5/1996 | Makino et al. | 424/494 |

FOREIGN PATENT DOCUMENTS

| | | | |
|---|---|---|---|
| EP | 0997148 A1 | 5/2000 | A61K/31/785 |
| GB | 2 262 527 A | 6/1993 | C08B/11/20 |
| JP | 48103717 A | 12/1973 | A61K/9/20 |
| JP | 07324101 A | 12/1995 | C08B/11/08 |
| JP | 10265501 | 10/1998 | C08B/11/08 |
| JP | 10279601 | 10/1998 | C08B/11/08 |
| JP | 2000007702 A2 * | 1/2000 | |
| WO | WO97/03654 | 2/1997 | A61K/9/14 |

OTHER PUBLICATIONS

European Search Report corresponding to Application No. 0110711.9; Mailed on Jun. 13, 2001.

* cited by examiner

*Primary Examiner*—James O. Wilson
*Assistant Examiner*—Everett White
(74) *Attorney, Agent, or Firm*—Myers Bigel Sibley & Sajovec

(57) ABSTRACT

An object of the present invention is to provide a process for the production of low-substituted hydroxypropyl cellulose wherein, in the formation of low-substituted hydroxypropyl cellulose particles, a granular material obtained by granulating the reaction product is neutralized with an acid to form neutralization-precipitated particles of low-substituted hydroxypropyl cellulose which can reduce the treating time as compared with conventional processes and, moreover, permit its ash content to be easily decreased in a subsequent washing step. Specifically, the reaction product of an alkali cellulose with a hydroxypropylating agent is granulated, and the resulting granular material is neutralized with an acid.

12 Claims, No Drawings

METHOD FOR THE FORMATION OF LOW-SUBSTITUTED HYDROXYPROPYL CELLULOSE PARTICLES

RELATED APPLICATION

This application claims priority and is related to Japanese Application No. 2000-005167, filed Jan. 14, 2000.

BACKGROUND OF THE INVENTION

1. Field of the Invention

This invention generally relates to a process for the production of low-substituted hydroxypropyl cellulose that is added for the purpose of imparting disintegration properties or binding properties during the manufacture of preparations in the fields of medicines, foods and the like. More particularly, it relates to a method for the formation of neutralization-precipitated particles of low-substituted hydroxypropyl cellulose in a purification step.

2. Description of the Related Art

In solid preparations for use in the fields of medicines, foods and the like, those composed of principal components alone have problems in that, when they are administered as medicines, they may not be satisfactorily disintegrated to such an extent as to exhibit a sufficient drug effect or in that, when they are formed into tablets or granules, they may fail to retain their form owing to poor binding properties. In such cases, disintegration properties or binding properties can be imparted by adding low-substituted hydroxypropyl cellulose to preparations.

Besides low-substituted hydroxypropyl cellulose, additives used for this purpose include carboxymethylcellulose calcium, crosslinked carboxymethylcellulose sodium, crosslinked polyvinyl pyrrolidone, carboxymethylstarch and the like. However, low-substituted hydroxypropyl cellulose has the advantage that it is nonionic and hence less liable to changes in properties due to reaction with ionic drugs or the like.

This advantage is utilized, for example, in a process wherein a powder of low-substituted hydroxypropyl cellulose is dry-blended with a drug and other pharmaceutical excipients, and the resulting blend is formed into tablets; and in a process wherein a powder of low-substituted hydroxypropyl cellulose is granulated by kneading with water or an aqueous solution of a water-soluble binder, and the resulting granules are molded.

Low-substituted hydroxypropyl cellulose may be produced as the reaction product of an alkali cellulose with propylene oxide. This can be done, for example, by soaking pulp in an aqueous solution of sodium hydroxide, pressing it to yield an alkali cellulose, and reacting the alkali cellulose with propylene oxide, or by dispersing powdered pulp in an organic solvent (e.g., isopropyl alcohol, tert-butyl alcohol or hexane), adding an aqueous solution of sodium hydroxide thereto so as to yield an alkali cellulose, and adding propylene oxide thereto and reacting it with the alkali cellulose.

Low-substituted hydroxypropyl cellulose is soluble in aqueous alkaline solutions, and sodium hydroxide used as a catalyst remains in the reaction product. In conventional processes, this reaction product is dissolved in water, and the remaining alkali is neutralized with an acid to form neutralization-precipitated particles of low-substituted hydroxypropyl cellulose.

In order to remove the salt formed in this step and other impurities, the neutralization-precipitated particles are washed with water or hot water. The washed material is pressed to remove water, dried, and pulverized to yield a final product of low-substituted hydroxypropyl cellulose.

Moreover, in conventional processes for the production of low-substituted hydroxypropyl cellulose, the reaction product is dissolved in water by means of a horizontal kneader or a vertical mixer and then neutralized by the addition of an acid to form neutralization-precipitated particles of low-substituted hydroxypropyl cellulose. In these processes, a long time is required to dissolve low-substituted hydroxypropyl cellulose. Furthermore, if the addition rate of an acid during neutralization is unduly high, coarse particles are formed to interfere with uniform neutralization. In a subsequent washing step, it is difficult to decrease the ash content of such coarse particles.

SUMMARY OF THE INVENTION

The present invention has been made in view of the above-described circumstances, and an object of the present invention is to provide a process for the production of low-substituted hydroxypropyl cellulose wherein, in the formation of low-substituted hydroxypropyl cellulose particles, a granular material obtained by granulating the reaction product is neutralized with an acid to form neutralization-precipitated particles of low-substituted hydroxypropyl cellulose which can reduce the treating time as compared with conventional processes and, moreover, permit its ash content to be easily decreased in a subsequent washing step.

As a result of intensive investigations carried out with a view to accomplishing the above object, the present inventors have now found that, in the formation of neutralization-precipitated particles of low-substituted hydroxypropyl cellulose, an improvement in treating capacity and hence a reduction in production cost can be achieved by granulating the reaction product of an alkali cellulose with a hydroxypropylating agent and neutralizing the resulting granular material with an acid. The present invention has been completed on the basis of this finding.

Accordingly, the present invention provides a method for the formation of neutralization-precipitated particles of low-substituted hydroxypropyl cellulose wherein a granular material obtained by granulating the reaction product is neutralized with an acid.

When a granular material obtained by granulating the reaction product is neutralized with an acid in the production of low-substituted hydroxypropyl cellulose and, more particularly, in the formation of neutralization-precipitated particles of low-substituted hydroxypropyl cellulose, the treating time can be reduced as compared with conventional processes. Moreover, the neutralization-precipitated particles obtained according to the present invention have a narrow particle size distribution and hence a low water content after washing, so that they exhibit excellent efficiency in ash extraction. Thus, there can be formed neutralization-precipitated particles of low-substituted hydroxypropyl cellulose which permit its ash content to be easily decreased in a subsequent washing step and thereby causes a reduction in the production cost of the product.

DETAILED DESCRIPTION OF THE PREFERRED EMBODIMENTS

The present invention will be more specifically described hereinbelow.

In the low-substituted hydroxypropyl cellulose of the present invention, the number of moles of the hydroxypropoxyl substituent group per mole of the glucose unit ($C_6H_{10}O_5$) is preferably in the range of 0.1 to 0.5. If the number of moles of the hydroxypropoxyl substituent group is less than 0.1, the resulting product may not exhibit the desired binding properties. If it is greater than 0.5, the resulting product may not exhibit the desired disintegration properties and, therefore, the resulting preparations (e.g., molded tablets) may have an unduly long disintegration time.

In the present invention, the reaction product of an alkali cellulose with a hydroxypropylating agent may be obtained according to any of various well-known techniques. This can be done, for example, by soaking raw pulp in a 10–50 wt % aqueous solution of sodium hydroxide, pressing it to yield an alkali cellulose, and reacting the alkali cellulose with a hydroxypropylating agent (e.g., propylene oxide) at 20–90° C. for about 2–8 hours; or by dispersing powdered pulp in an organic solvent (e.g., isopropyl alcohol, tert-butyl alcohol or hexane), adding an aqueous solution of sodium hydroxide thereto so as to yield an alkali cellulose, and adding a hydroxypropylating agent (e.g., propylene oxide or propylene chlorohydrin) thereto and reacting it with the alkali cellulose.

In the present invention, the reaction product of an alkali cellulose with a hydroxypropylating agent is fed to a granulating machine, in which the reaction product is tumbled or consolidated to yield a granular material of the reaction product. Then, neutralization-precipitated particles of low-substituted hydroxypropyl cellulose are formed by adding this granular material to an acid.

In conventional processes, the apparent density of the product has been controlled by varying the amount of water used to dissolve the reaction product or by adding an appropriate amount of an acid previously to the reaction product so as to neutralize a portion of the reaction product during dissolution and thereby regulate the solubility of the reaction product (i.e., low-substituted hydroxypropyl cellulose) in water. In the present invention, however, the apparent density of the product is controlled by granulation, without passing through a dissolution step.

Moreover, as contrasted with conventional processes in which the size of neutralization-precipitated particles and the particle size distribution thereof have been controlled by the addition rate of an acid during neutralization, the present invention controls them by the granulation step.

As to the mechanism of this granulation, the reaction product comprising low-substituted hydroxypropyl cellulose has a fibrous form, and contains therein residual sodium hydroxide, water, and an organic solvent (depending on the treating method). When this reaction product is tumbled or disintegrated by agitation in a granulating machine, the water contained in the reaction product migrates to the outer layer, so that liquid-liquid crosslinking causes granulation to proceed. With the progress of this granulation, the reaction product in fibrous form is shaped into spherules, resulting in an increased apparent density of the product.

The reaction product comprises low-substituted hydroxypropyl cellulose, sodium hydroxide used as a catalyst, and water, and the amounts of sodium hydroxide and water depend on the composition of the alkali cellulose used as a raw material for reaction. And, it is these sodium hydroxide and water that affect the granulation process. The preferable amount of sodium hydroxide for the granulation process is in the range of 10 to 100% by weight based on the low-substituted hydroxypropyl cellulose. If it is less than 10% by weight, the granulation will not proceed, and if it is greater than 100% by weight, the degree of polymerization of the low-substituted hydroxypropyl cellulose may be greatly reduced. The preferable amount of water for the granulation process is in the range of 20 to 150% by weight based on the low-substituted hydroxypropyl cellulose. If it is less than 20% by weight, the granulation may not proceed, and if it is greater than 150% by weight, the low-substituted hydroxypropyl cellulose may not be uniformly neutralized because it may be partially dissolved to form a mass like rice cake.

Useful granulating machines include a vertical agitation granulator, a horizontal agitation granulator, a batch type kneader, a horizontal short-shaft continuous kneader, a horizontal double-shaft continuous kneader and the like.

In the case of a continuous kneader, the apparent density of the product can be controlled by the residence time of the reaction product in the kneader.

When such a continuous kneader is used, the residence time can be regulated by varying the arrangement of built-in paddles, the rotational speed, the opening of the outlet port, and the like. The residence time can be measured by adding a pigment at the inlet port, sampling the granulated reaction product emerging from the outlet port at regular intervals, and determining the average residence time defined as the residence time of the sample having the highest pigment concentration. Although the residence time may vary according to the desired apparent density of the product, it is generally in the range of about 30 to 300 seconds.

Such continuous kneaders can reduce the time required for the formation of neutralization-precipitated particles of the reaction product and thereby improve the treating rate, as compared with batch type mixers. Moreover, since the treatment can be carried out by use of small-sized equipment, the equipment cost and floorspace requirements can be reduced.

The continuous kneaders which can be used in the present invention include continuous kneaders of the single-shaft type and of the double-shaft type. In the present invention, however, a continuous kneader of the double-shaft type is preferably used because of its excellent kneading properties. In such a kneader, the residence time or the degree of kneading can be controlled by the combination of built-in paddles. The L/D ratio (i.e., the ratio of the trough length to the paddle diameter) of the continuous kneader may be in the range of about 5 to 13. If the L/D ratio is less than 5, the granulation may not proceed and, therefore, the content of fibrous matter in the product may be increased to such an extent as to reduce the apparent density of the product. If the L/D ratio is greater than 13, excessive kneading may disadvantageously cause changes in properties, such as a reduction in the degree of polymerization of the product and an increase in the degree of yellowness of the product.

In the case of a batch type granulator, the state of granulation varies according to the amount of water added during granulation. As the amount of water is increased, the granulation proceeds to a higher degree. Moreover, the apparent density of the product increases with the degree of granulation. Although the amount of water added may vary according to the composition of the low-substituted hydroxypropyl cellulose reaction product used, it is generally preferable that the weight of water be not greater than 1.5 times the weight of the reaction product. If the amount of water is greater, the reaction product may not be uniformly neutralized because it may be partially dissolved to form a mass like rice cake.

The temperature employed for the granulation of low-substituted hydroxypropyl cellulose is preferably 60° C. or below. If the reaction product is treated at temperatures above 60° C., the degree of polymerization of the reaction product may be significantly reduced.

The acids which can be used in the neutralization step of the present invention include, for example, organic acids such as acetic acid, formic acid and propionic acid; and inorganic acids such as hydrochloric acid and sulfuric acid. Although the concentration thereof may be arbitrarily chosen, it is preferably in the range of about 5 to 10% by weight.

Subsequently, the neutralization-precipitated material is diluted with water or hot water to form a slurry, and this slurry is washed according to a conventional technique such as filtration under reduced pressure or filtration under pressure. The washed material is dewatered by pressing in the usual manner, dried in a stationary oven, fluidized bed dryer or the like, and then pulverized by means of an impact pulverizer, ball mill or the like to yield a final product.

The present invention is more specifically explained with reference to the following examples and comparative examples. However, these examples are not to be construed to limit the scope of the invention.

EXAMPLE 1

Pulp was dipped in a 43 wt % solution of sodium hydroxide and then pressed to obtain an alkali cellulose composed of 22.2% by weight of NaOH, 44.8% by weight of cellulose, and 33.0% by weight of $H_2O$. A reactor having a capacity of 5 liters was charged with 350 g (on a cellulose basis) of the alkali cellulose, and its atmosphere was replaced with nitrogen. After the addition of 79 g (0.226 part by weight per part by weight of cellulose) of propylene oxide, reaction was effected at a jacket temperature of 45° C. for 2 hours and 65° C. for 30 minutes. Thus, there was obtained 857 g of a crude hydroxypropyl cellulose product in which the number of moles of the hydroxypropoxyl substituted group per mole of the glucose unit was 0.25. While a double-shaft continuous kneader (KRC Kneader Model S2, manufactured by Kurimoto Tekkojo Co., Ltd.; with a paddle diameter of 50 mm, a barrel length of 660 mm, an L/D ratio of 13.2, and an internal volume of 1.2 liters) was operated at a rotational speed of 100 rpm, a residence time of 105 seconds, and a jacket temperature of 20° C., the above reaction product was fed thereto at a constant rate of 150 g per minute and thereby granulated to yield a granular material of the reaction product. This granular material of the reaction product was neutralized by placing 5,160 g (i.e., an amount equivalent to sodium hydroxide contained in the reaction product) of 5 wt % acetic acid in a 10-liter vessel, and adding the granular material thereto. The total amount of the granular material could be treated in 5.7 minutes. The result of a washing test carried out according to the testing procedure which will be described later, and the result of a loose apparent density measurement made by washing the resulting neutralization-precipitated product, drying it, reducing it to a powder, and measuring the loose apparent density of a powder sample deposited through a 200-mesh (75 μm) screen are shown in Table 1.

EXAMPLE 2

While a double-shaft continuous kneader (KRC Kneader Model S2, manufactured by Kurimoto Tekkojo Co., Ltd.; with a paddle diameter of 50 mm, a barrel length of 660 mm, an L/D ratio of 13.2, and an internal volume of 1.2 liters) was operated at a rotational speed of 100 rpm, a residence time of 30 seconds, and a jacket temperature of 20° C. and with a paddle arrangement different from that used in Example 1, the same reaction product as used in Example 1 was fed thereto at a constant rate of 200 g per minute and thereby granulated to yield a granular material of the reaction product. This granular material of the reaction product was neutralized by placing 5,160 g (i.e., an amount equivalent to sodium hydroxide contained in the reaction product) of 5 wt % acetic acid in a 10-liter vessel, and adding the granular material thereto. The total amount of the granular material could be treated in 4.3 minutes. The result of a washing test carried out according to the testing procedure which will be described later, and the result of a loose apparent density measurement made by washing the resulting neutralization-precipitated product, drying it, reducing it to a powder, and measuring the loose apparent density of a powder sample deposited through a 200-mesh screen are shown in Table 1.

EXAMPLE 3

While a double-shaft continuous kneader (KRC Kneader Model S2, manufactured by Kurimoto Tekkojo Co., Ltd.; with a paddle diameter of 50 mm, a barrel length of 660 mm, an L/D ratio of 13.2, and an internal volume of 1.2 liters) was operated at a rotational speed of 150 rpm, a residence time of 80 seconds, and a jacket temperature of 20° C. and with the same paddle arrangement as used in Example 1, the same reaction product as used in Example 1 was fed thereto at a constant rate of 150 g per minute and thereby granulated to yield a granular material of the reaction product. This granular material of the reaction product was neutralized by placing 5,160 g (i.e., an amount equivalent to sodium hydroxide contained in the reaction product) of 5 wt % acetic acid in a 10-liter vessel, and adding the granular material thereto. The total amount of the granular material could be treated in 5.7 minutes. The result of a washing test carried out according to the testing procedure which will be described later, and the result of a loose apparent density measurement made by washing the resulting neutralization-precipitated product, drying it, reducing it to a powder, and measuring the loose apparent density of a powder sample deposited through a 200-mesh screen are shown in Table 1.

EXAMPLE 4

Pulp was soaked in a 43 wt % solution of sodium hydroxide and then pressed to obtain an alkali cellulose composed of 25.7% by weight of NaOH, 37.4% by weight of cellulose, and 36.9% by weight of $H_2O$. A reactor having a capacity of 5 liters was charged with 350 g (on a cellulose basis) of the alkali cellulose, and its atmosphere was replaced with nitrogen. After the addition of 85.8 g (0.245 part by weight per part by weight of cellulose) of propylene oxide, reaction was effected at a jacket temperature of 45° C. for 2 hours and 65° C. for 30 minutes. Thus, there was obtained 1,021 g of a crude hydroxypropyl cellulose product in which the number of moles of the hydroxypropoxyl substituent group per mole of the glucose unit was 0.23. While a double-shaft continuous kneader (KRC Kneader Model S2, manufactured by Kurimoto Tekkojo Co., Ltd.; with a paddle diameter of 50 mm, a barrel length of 660 mm, an L/D ratio of 13.2, and an internal volume of 1.2 liters) was operated at a rotational speed of 100 rpm, a residence time of 105 seconds, and a jacket temperature of 20° C., the above reaction product was fed thereto at a constant rate of 150 g per minute and thereby granulated to yield a granular material of the reaction product. This granular material of the reaction product was neutralized by placing 7,215 g (i.e., an amount equivalent to sodium hydroxide contained in the reaction product) of 5 wt % acetic acid in a 10-liter vessel, and adding the granular material thereto. The total amount of the granular material could be treated in 6.8 minutes. The result of a washing test carried out according to the testing procedure which will be described later, and the result of a loose apparent density measurement made by washing the resulting neutralization-precipitated product, drying it, reducing it to a powder, and measuring the loose apparent density of a powder sample deposited through a 200-mesh screen are shown in Table 1.

EXAMPLE 5

An agitation granulator (Vertical Granulator FM-VG-05, manufactured by Powrex Corp.) was charged with 400 g of the same reaction product as used in Example 1. While this reaction material was agitated at a rotational speed of 800 rpm and a chopper speed of 900 rpm, 262 g of water was added thereto in 1 minute and granulation was then effected for 5 minutes. The resulting granular material of the reaction product was neutralized by placing 2,742 g (i.e., an amount equivalent to sodium hydroxide contained in the reaction product) of 5 wt % acetic acid in a 5-liter vessel, and adding the granular material thereto. The result of a washing test carried out according to the testing procedure which will be described later, and the result of a loose apparent density measurement made by washing the resulting neutralization-precipitated product, drying it, reducing it to a powder, and measuring the loose apparent density of a powder sample deposited through a 200-mesh screen are shown in Table 1.

EXAMPLE 6

An agitation granulator (vertical Granulator FM-VG-05, manufactured by Powrex Corp.) was charged with 400 g of the same reaction product as used in Example 1. While this reaction material was agitated at a rotational speed of 800 rpm and a chopper speed of 900 rpm, 351 g of water was added thereto in 1 minute and granulation was then effected for 5 minutes. The resulting granular material of the reaction product was neutralized by placing 2,742 g (i.e., an amount equivalent to sodium hydroxide contained in the reaction product) of 5 wt % acetic acid in a 5-liter vessel, and adding the granular material thereto. The result of a washing test carried out according to the testing procedure which will be described later, and the result of a loose apparent density measurement made by washing the resulting neutralization-precipitated product, drying it, reducing it to a powder, and measuring the loose apparent density of a powder sample deposited through a 200-mesh screen are shown in Table 1.

EXAMPLE 7

An agitation granulator (Proshear Mixer WB-10, manufactured by Taiheiyo Kiko Co., Ltd.) was charged with 600 g of the same reaction product as used in Example 1. While this reaction material was agitated at a rotational speed of 250 rpm and a chopper speed of 2,000 rpm, 526.8 g of water was added thereto in 1 minute and granulation was then effected for 20 minutes. The resulting granular material of the reaction product was neutralized by placing 4,080 g (i.e., an amount equivalent to sodium hydroxide contained in the reaction product) of 5 wt % acetic acid in a 5-liter vessel, and adding the granular material thereto. The result of a washing test carried out according to the testing procedure which will be described later, and the result of a loose apparent density measurement made by washing the resulting neutralization-precipitated product, drying it, reducing it to a powder, and measuring the loose apparent density of a powder sample deposited through a 200-mesh screen are shown in Table 1.

Comparative Example 1

A 5-liter batch type kneader was charged with 1,925 g of water at 45° C. and 52 g of glacial acetic acid. Then, the total amount (857 g) of a crude reaction product obtained in the same manner as in Example 1 was added thereto and dissolved therein. One hour was required to dissolve the crude reaction product completely. Thereafter, precipitation by neutralization was effected by adding 633 g of 33 wt % acetic acid thereto at a rate of 20 g per minute. The overall time required for this treatment was 1 hour and 32 minutes. The result of a washing test carried out according to the testing procedure which will be described later, and the result of a loose apparent density measurement made by washing the resulting neutralization-precipitated product, drying it, reducing it to a powder, and measuring the loose apparent density of a powder sample deposited through a 200-mesh screen are shown in Table 1.

Comparative Example 2

A 5-liter batch type kneader was charged with 1,925 g of water at 45° C. and 52 g of glacial acetic acid. Then, the total amount (857 g) of a crude reaction product obtained in the same manner as in Example 1 was added thereto and dissolved therein. One hour was required to dissolve the crude reaction product completely. Thereafter, precipitation by neutralization was effected by adding 633 g of 33 wt % acetic acid thereto at a rate of 40 g per minute. The product contained many filmlike coarse particles. The overall time required for this treatment was 1 hour and 16 minutes. The result of a washing test carried out according to the testing procedure which will be described later, and the result of a loose apparent density measurement made by washing the resulting neutralization-precipitated product, drying it, reducing it to a powder, and measuring the loose apparent density of a powder sample deposited through a 200-mesh screen are shown in Table 1.

Procedures for Evaluation Tests

Washing Test

A slurry was formed by diluting a neutralization-precipitated product with hot water at 60° C. so as to give a concentration of 4% by weight (on a cellulose basis). Using a pressure filter, this slurry was filtered under a pressure of 49 kPa to remove the liquid. Thereafter, 50 g of hot water at 80° C. was added and the liquid was removed in the same manner as described above. After this procedure was repeated three times, its washability was evaluated by the average filtration time (or liquid removal time) and the ash content of the product after the third washing. The ash content was determined according to the Pharmacopoeia of Japan.

Measurement of Apparent Density

Using a powder tester (manufactured by Hosokawa Micron Corporation), the loose apparent density of a sample was determined by adding the sample to a 100-milliliter vessel and measuring its weight. The loose apparent density of a sample is an apparent density in its loosely packed state, and can be determined by feeding the sample into a cylindrical vessel having a diameter of 5.03 cm and a height of 5.03 cm (hence an internal volume of 100 ml) from 23 cm above the vessel through a Japanese Industrial Standard (JIS) 22-mesh screen (710 μm), leveling its top surface, and measuring its weight.

TABLE 1

|  | Liquid removal time (seconds) | Ash content (%) | Loose apparent density (g/ml) |
|---|---|---|---|
| Example 1 | 6 | 0.02 | 0.336 |
| Example 2 | 5 | 0.01 | 0.291 |
| Example 3 | 7 | 0.03 | 0.325 |
| Example 4 | 9 | 0.08 | 0.412 |
| Example 5 | 8 | 0.02 | 0.278 |
| Example 6 | 7 | 0.1 | 0.388 |
| Example 7 | 10 | 0.5 | 0.374 |
| Comparative Example 1 | 32 | 2.32 | 0.321 |
| Comparative Example 2 | 16 | 8.2 | 0.335 |

What is claimed is:

1. A method for the formation of low-substituted hydroxypropyl cellulose particles, said method comprises the steps of:
   granulating a reaction product of an alkali cellulose with a hydroxypropylating agent to provide a granular material;
   neutralizing the granular material with an acid to provide a neutralized granular material;
   diluting the neutralized granular material with water to form a slurry;
   washing the slurry to provide a washed material;
   dewatering the washed material to provide a dewatered material; and
   pulverizing the dewatered material to form low-substituted hydroxypropyl cellulose particles.

2. A method for the formation of low-substituted hydroxypropyl cellulose particles as claimed in claim 1 wherein said reaction product is continuously granulated by means of a double-shaft continuous kneader.

3. A method for the formation of low-substituted hydroxypropyl cellulose particles as claimed in claim 2 wherein the apparent density of the product is controlled by said granulation.

4. A method for the formation of low-substituted hydroxypropyl cellulose particles as claimed in claim 1 wherein the apparent density of the product is controlled by said granulation.

5. The method according to claim 1, wherein the reaction product comprises low-substituted hydroxypropyl cellulose, sodium hydroxide, and water.

6. The method according to claim 5, wherein the amount of sodium hydroxide is in the range of about 10 to about 100 percent by weight based on the low-substituted hydroxypropyl cellulose.

7. The method according to claim 5, wherein the amount of water is in the range of about 20 to about 150 percent by weight based on the low-substituted hydroxypropyl cellulose.

8. The method according to claim 5, wherein:
   the amount of sodium hydroxide is in the range of about 10 to about 100 percent by weight based on the low-substituted hydroxypropyl cellulose; and
   the amount of water is in the range of about 20 to about 150 percent by weight based on the low-substituted hydroxypropyl cellulose.

9. The method according to claim 1, wherein the granulating of the reaction product comprises continuously granulating the reaction product using a continuous kneader.

10. The method according to claim 9, wherein the reaction product is continuously granulated in the continuous kneader for a residence time in the range of about 30 to about 300 seconds.

11. The method according to claim 9, wherein the L/D ratio of the continuous kneader is in the range of about 5 to about 13.

12. The method according to claim 1, wherein the granulating of the reaction product is performed at a temperature of about 60° C. or below.

* * * * *